(12) United States Patent
Timmermann (10) Patent No.: US 10,464,403 B2
(45) Date of Patent: Nov. 5, 2019

(54) SEALING ARRANGEMENT FOR A VEHICLE WINDOW

(71) Applicant: SAINT-GOBAIN GLASS FRANCE, Courbevoie (FR)

(72) Inventor: Alwin Timmermann, Cologne (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/145,136

(22) Filed: Sep. 27, 2018

(65) Prior Publication Data

US 2019/0031006 A1    Jan. 31, 2019

Related U.S. Application Data

(63) Continuation of application No. 15/022,915, filed as application No. PCT/EP2014/068816 on Sep. 4, 2014, now Pat. No. 10,112,467.

(30) Foreign Application Priority Data

Sep. 24, 2013 (EP) ..................................... 13185754

(51) Int. Cl.
| | |
|---|---|
| *B60J 10/70* | (2016.01) |
| *B60J 10/34* | (2016.01) |
| *B60J 10/00* | (2016.01) |
| *E06B 7/23* | (2006.01) |

(52) U.S. Cl.
CPC ............... *B60J 10/70* (2016.02); *B60J 10/34* (2016.02); *B60J 10/45* (2016.02); *E06B 7/23* (2013.01)

(58) Field of Classification Search
CPC ............... B60J 10/0068; B60J 10/0071; B60J 10/0088; B60J 10/02; B60J 10/18; B60J 10/30; B60J 10/32; B60J 10/33; B60J 10/34; B60J 10/45; B60J 10/70
See application file for complete search history.

(56) References Cited

U.S. PATENT DOCUMENTS

| | | | |
|---|---|---|---|
| 6,748,706 B2 * | 6/2004 | Gaiser | B60R 13/07 52/204.53 |
| 9,168,879 B2 * | 10/2015 | Timmermann | B60J 1/02 |
| 10,112,467 B2 | 10/2018 | Timmermann | |

(Continued)

FOREIGN PATENT DOCUMENTS

WO    WO 2012/089309 A1    7/2012

*Primary Examiner* — Jason S Morrow
(74) *Attorney, Agent, or Firm* — Steinfl + Bruno LLP (57) ABSTRACT

A sealing arrangement for a vehicle window is described. The sealing arrangement includes at least a retaining rail with a latching channel, wherein the latching channel includes a guide rail and a spring leg, and the retaining rail is fastened to a window; and a covering with a latching rail, wherein the guide rail, together with the spring leg, surrounds the latching rail in the latching channel, and wherein the spring leg and the latching rail are oriented so as to latch parallel to each other. The covering includes a covering edge that makes contact with a glass edge of the window. The guide rail includes a spring element, and the spring element is arranged and tensioned on a contact surface on the lower side of the covering, bears against the latching rail via a centering cam and, together with the covering edge, fixes and centers the covering in the latching channel.

16 Claims, 5 Drawing Sheets

(56) References Cited

U.S. PATENT DOCUMENTS

| | | | |
|---|---|---|---|
| 2011/0018303 A1* | 1/2011 | Timmermann | B60J 10/35 |
| | | | 296/90 |
| 2013/0214560 A1* | 8/2013 | Sasaki | B62D 25/081 |
| | | | 296/192 |
| 2016/0075221 A1* | 3/2016 | Timmermann | B60J 10/30 |
| | | | 49/480.1 |
| 2016/0101675 A1* | 4/2016 | Timmermann | B60J 10/18 |
| | | | 296/93 |
| 2016/0229278 A1 | 8/2016 | Timmermann | |
| 2019/0031005 A1* | 1/2019 | Schlater | B60J 10/25 |
| 2019/0160928 A1* | 5/2019 | Bergmann | B60J 10/70 |

* cited by examiner

A retaining rail (3) is bonded to a window pane (1) via an adhesive bond (2).

The cover (7) is pushed with a latching rail (9) into a latching channel (4) beyond a latching hook (14) under tensioning of a spring element (11) between the guide rail (5) and a contact surface (12) on the bottom of the cover (7).

The cover (7) moves back under relaxation of the spring element (11) and the latching hook (14) is engaged against the latching rail (9).

SEALING ARRANGEMENT FOR A VEHICLE WINDOW

CROSS REFERENCE TO RELATED APPLICATIONS

The present application is a continuation of U.S. patent application Ser. No. 15/022,915, filed Mar. 17, 2016, which is the US national stage of International Patent Application PCT/EP2014/068816 filed on Sep. 4, 2014, which in turn claims priority to European Patent Application No. 13185754.2 filed Sep. 24, 2013, the contents of all of which are incorporated by reference in their entireties.

The invention relates to a sealing arrangement for motor vehicle window panes, a method for its production, and its use.

Motor vehicles must, as a rule, be protected, in the region between the windshield and the engine body, against moisture, airflow generated by driving, and penetrating dirt. At the same time, the transition zone between the windshield and the metal car body must be sealed. In this transition region, water boxes made of plastic are often used. Water boxes protect splash-water-sensitive components in the motor vehicle against moisture. The water box cover enables draining of the water accumulating on the windshield. However, the materials glass, various plastics, and metal have significantly different properties that make special considerations necessary during sealing. In order to enable secure sealing, polymeric materials such as rubber gaskets are often used, particularly in the critical region of the water box. A special water box seal that is arranged between the lower edge of the windshield and the water box cover often assumes this role. This water box seal must be stable, resistant, and also simple to install. The water box seal is usually produced by extrusion methods; it is fixed on the components by suitable adhesives and adhesive systems.

DE 199 61 706 A1 discloses an arrangement for joining a fixedly installed windshield to a car body component, in particular, to a water box. The arrangement comprises a profiled strip with a lip adhering to the vehicle window pane. The lip has, on its underside, means for joining to a component.

DE 10 2009 026 369 A1 discloses a sealing arrangement for motor vehicle window panes. It comprises a retaining rail, a windshield, and a cover connected via a connection point to a latching rail. The retaining rail comprises a latching channel that is formed with a spring leg and a support body. The cover is engaged with the latching rail in the latching channel and a spring element is arranged between the contact surface of the cover and the support body.

WO 2013/120671 A1 discloses a sealing arrangement for motor vehicle window panes. The arrangement comprises a retaining rail attached to a window pane with a latching channel that is formed by a guide rail and a spring leg. Moreover, the sealing arrangement comprises a cover with a guide channel, which is formed by the latching rail and a positioning stop. The centering and fixing of the sealing arrangement is accomplished by tensioning the guide rail in the guide channel and engaging the latching rail in the latching channel.

DE 199 39 191 A1 discloses an arrangement for connecting a motor vehicle window pane to an adjacent component by means of a profiled part, which is, on the one hand, fastened to the pane edge and, on the other, supports the component.

In order to be able to obtain high leak-tightness and stability of the sealing arrangement, in particular, perfectly fitting locking, very precise production is required. If the components produced deviate only slightly from the production specifications, very high forces are frequently required for locking the components. Depending on the deviation, even only limited sealing can result. High locking forces and production tolerances can also negatively affect the positioning accuracy of the sealing arrangement and make the installation process significantly more difficult.

The object of the invention resides in providing a sealing arrangement for motor vehicle window panes, which is less sensitive to production tolerances and requires only low forces for durable and secure locking of the individual components, whereby, at the same time, the gap between the motor vehicle window pane and the cover is closed.

The sealing arrangement for a vehicle window pane according to the invention comprises at least a retaining rail with a latching channel. The latching channel comprises a guide rail and a spring leg. The retaining rail is fastened to a window pane. The retaining rail can be attached via an adhesive or an adhesive tape. The retaining rail serves as a connection piece between the pane and the vehicle body component. The invention further comprises a cover, in particular, a water box cover, with a latching rail, wherein the guide rail, together with the spring leg, surrounds the latching rail in the latching channel. The spring leg and the latching rail are oriented so as to latch parallel to each other parallel. At the same time, the cover makes contact, by means of the cover edge, with a glass edge of the pane. The expression "makes contact" includes, in the context of the invention, in the non-loaded state, at least section-wise contact between the cover and the glass edge. Due to installation tolerances, the direct contact between the cover and the glass edge extends to more than 50%, preferably more than 70%, and particularly preferably more than 90% of the length of the cover, with the spacing (in the following, also referred to as joint or gap) in the remaining region being less than 0.5 mm. Such a small gap region is adequate to keep contaminants such as leaves, small stones, or sand, away from the interior of the sealing arrangement.

The guide rail includes, on the end facing away from the window pane, a spring element, with the spring element bearing against a contact surface on the bottom of the cover and preferably against the direction of insertion such that, by means of the spring force, pressure is exerted against the bottom of the cover. The spring element is, in cross-section, preferably implemented as a single lip, particularly preferably finger- or tongue-shaped. Together with the guide rail, the spring element seals the contact surface, preferably completely, on the bottom of the cover and, at the same time, supports it. The spring element preferably has a high specific stiffness. The spring element seals the latching channel against the outside atmosphere. The guide rail rests against the latching rail via a centering cam and fixes and centers the cover, together with the cover edge, within the latching channel. The cover edge can be implemented both as a fixed part of the cover, but also include a different material, preferably an elastic material. The cover edge is preferably implemented triangular, rectangular, or trapezoidal in cross-section.

The latching rail rests against the guide rail via a centering cam and, together with the window pane, centers the latching rail. The centering cam is implemented as a bulge or protrusion of the guide rail. The centering cam is preferably an uninterrupted part of the guide rail.

The centering cam and the glass edge of the window pane center the cover in the lateral direction to the pane, in other words, in the plane of the pane and orthogonal to the glass edge of the pane, and, thus, the latching rail in the latching channel. The locking arrangement consisting of the spring leg and the latching rail is thus relieved of the centering or positioning task and can, accordingly, be designed with thin walls, resulting, in turn, in small engagement forces. The locking arrangement consisting of the spring leg and the latching rail is designed to only exert a retention force on the cover and thus to prevent a "disengagement" of the cover out of the latching channel. A centering rib or a positioning stop, as they are known in the prior art, is no longer necessary.

All this has the advantage according to the invention that no undesirable shadow joint (gap) appears between the cover and the pane. Despite possible and sometimes inevitable manufacturing tolerances, precise positioning of the retaining rail as well as the cover on the window pane is possible via the cover edge and the centering cam.

The spring element preferably includes elastomers and/or thermoplastic elastomers, preferably polyurethanes, polyolefins, polysulfides, polyepoxides, and rubber, such as natural rubber, nitrile rubber (NBR), styrene butadiene rubber, butadiene acrylonitrile rubber, ethylene propylene diene rubber, silicones such as RTV—(room-temperature-vulcanizing silicone rubber), HTV—(high-temperature-vulcanizing) silicone rubber, peroxide-vulcanizing silicone rubber, and/or addition-vulcanizing silicone rubber, polyacrylates, styrene/butadiene block copolymers (SBS), and/or ethylene propylene diene rubber (EPDM).

The spring element is preferably implemented as a (partially) hollow body, a porous solid body, or as a solid body. The different design of the spring element enables additional variation and control of stability, weight, and elasticity.

The spring element preferably has a Shore hardness of Shore A 40 to Shore A 90, preferably Shore A 50 to Shore A 75. The Shore hardness according to the invention enables a reversible but, at the same time, firm and leakproof sealing of the contact surface.

The spring element preferably has a length of 2 mm to 8 mm, preferably 3 mm to 6 mm. This length enables optimum sealing and centering of the spring element. If a greater length were selected, the supporting action can decrease; with a shorter length, the sealing can be partially limited. The spring element preferably has a diameter at the foot point of 0.5 mm to 3 mm, particularly preferably 1 mm to 2 mm. The "foot point" refers to the zone of the contact region of the spring element with the guide rail. The spring element preferably has a diameter on the free end of 0.2 mm to 1.5 mm, preferably from 0.5 mm to 1 mm. Particularly in combination with a Shore hardness of the spring element from Shore A 40 to Shore A 90, the dimensions mentioned improve the simultaneous supporting, sealing, and, especially, centering action of the spring element.

The retaining rail and/or the guide rail preferably contain a reinforcing insert. The reinforcing insert increases the stability of the retaining rail and enables further regulation of the stability. The reinforcing insert preferably includes metals, organic polymers, or composite materials.

The cover edge can be made of the same material as the cover and preferably be designed in one piece with the rest of the cover.

In an advantageous embodiment of the invention, the cover edge has a rubberlike, elastic seal, preferably in the form of an edge. The elastic seal is preferably arranged adjacent the glass edge of the window pane and designed such that it makes contact therewith. In a particularly advantageous embodiment of the cover edge according to the invention, the elastic seal is arranged on the bottom of the cover and cannot be seen from the outside. To this end, the cover can be tapered on the bottom and the cover edge can completely or partially fill the taper. This embodiment yields the greatest possible homogeneous appearance of the arrangement of the pane and the cover.

The elastic seal has, as a soft component, a preferably lower hardness and stiffness than the cover. By means of its elastic form, component tolerances are minimized and the risk of development of relative movements between the cover and the window pane is reduced. The elastic seal preferably has a Shore hardness of Shore A 40 to Shore A 75, preferably Shore A 50 to Shore A 65. The Shore hardness according to the invention enables adequate stability for centering as well as adequate flexibility for compensation of production tolerances.

The retaining rail is preferably bonded to the window pane via an adhesive bond. The adhesive bond enables a simple, stable, and durable fastening of the window pane on the retaining rail and through it on the mounting part. The adhesive bond preferably comprises or contains acrylate adhesives, methyl methacrylate adhesives, cyanoacrylate adhesives, polyepoxides, silicone adhesives, and/or silane-curing polymer adhesives, as well as mixtures and/or copolymers thereof. The contact surface of the adhesive bond with the pane or retaining rail can, optionally, be pretreated, for example, with a primer or a plasma treatment.

The adhesive bond preferably comprises a double-sided adhesive tape. The double-sided adhesive tape enables quick and precise fixing of the pane on the retaining rail. Curing of the adhesive is, as a rule, unnecessary. Dosing of the adhesive is also eliminated.

In an advantageous embodiment variant, the spring leg includes a metal or plastic insert, preferably a metal foil or metal spring.

In an alternative embodiment variant, the spring leg is implemented without metal or plastic inserts. By this means, particularly low engagement forces are obtained for the engagement of the latching rail between the guide rail and the spring leg. The spring leg can, in particular, contain or consist of a folded or rolled metal foil with an attached, for example, polymeric, latching hook.

The spring leg preferably has a latching hook. The latching hook is preferably implemented in the form of a barbed hook and improves the latching and anchoring of the spring leg with the latching rail.

The latching hook preferably has a rounded surface, which yields simpler engagement with the latching rail with simultaneously greater stability against subsequent separation of the engagement.

The latching rail preferably includes recesses or bulges. These structural elements enable and secure the engagement and locking of the spring leg with the latching rail and thus the fixing of the installed part, for example, a water box, to the window pane.

The spring leg is preferably deflectable or deflectably connected to the retaining rail. Depending on the deflection force, the connection between the installed part and the window pane can be reversibly or irreversibly closed.

The invention further comprises a method for producing a sealing arrangement. In a first step, a retaining rail is bonded to a window pane via an adhesive bond. In a following step, a guide rail is arranged inside a guide channel of a cover. At the same time or subsequently, the cover with a latching rail is pushed into a latching channel beyond a latching hook under tensioning of a spring element between the guide rail and a contact surface on the bottom of the cover. In the following step, the cover moves back under relaxation of the spring element and the latching hook is engaged against the latching rail.

The invention further includes the use of a sealing arrangement according to the invention for a windshield or rear window, preferably as a water box cover of a windshield.

In the following, the invention is explained in detail with reference to drawings. The drawings are a purely schematic representation and not true to scale. They in no way restrict the invention.

They depict.

Figure 1:
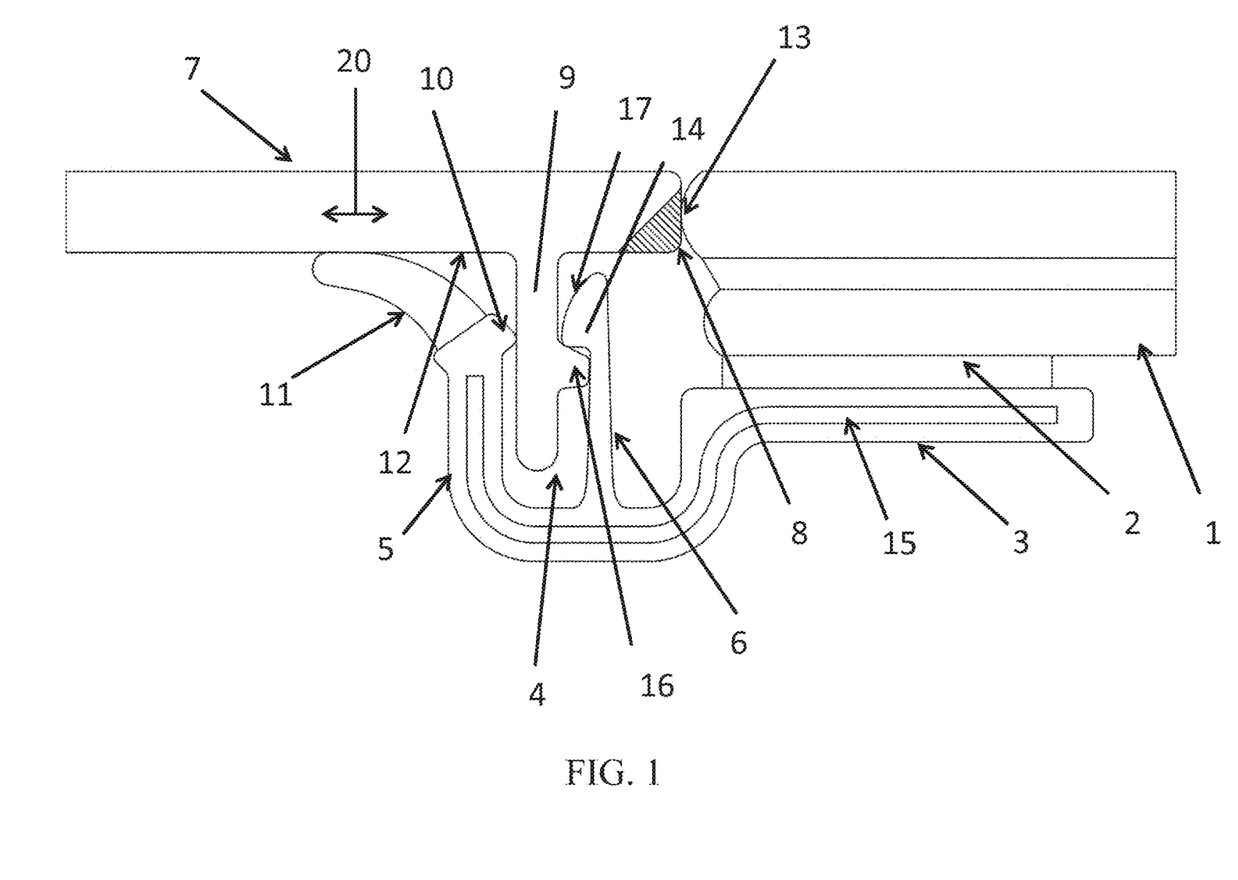
FIG. 1 a cross-section of the sealing arrangement according to the invention.
Figure 2:
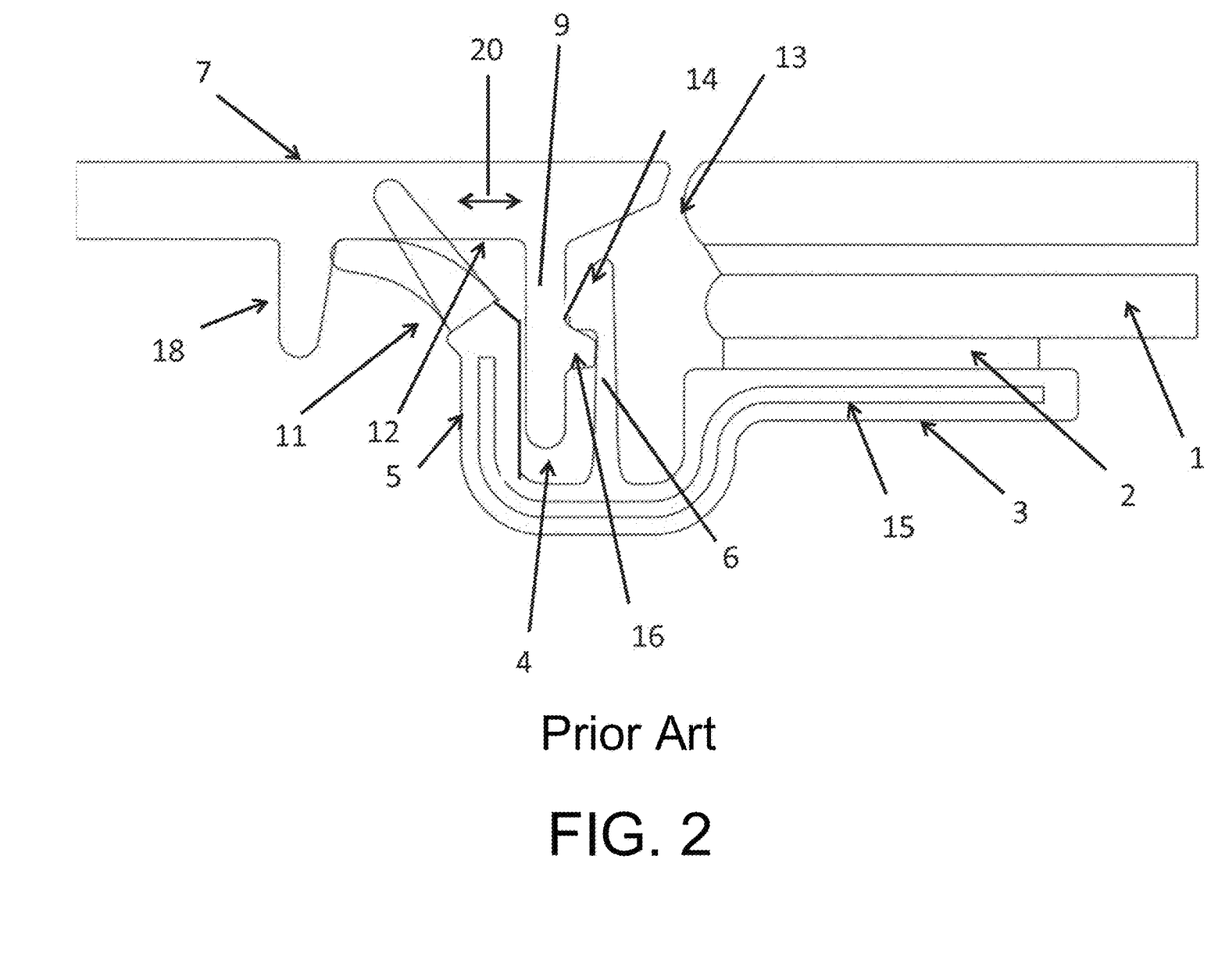
FIG. 2 a cross-section of a sealing arrangement according to the prior art.

FIG. 1 depicts a cross-section of the sealing arrangement according to the invention. A pane 1, preferably a composite glass pane, is bonded to a retaining rail 3 via an adhesive bond 2. In an optional embodiment of the invention, the contact surface of the adhesive can be pretreated, for example, with a primer or a plasma treatment of the retaining rail. The retaining rail 3 serves for bonding a vehicle component, preferably a water box, to the window pane 1. The retaining rail 3 includes a latching channel 4, wherein the latching channel 4 is formed by a guide rail 5 and a spring leg 6. The retaining rail 3 includes a reinforcing insert 15. The reinforcing insert 15 preferably includes metals and elastic plastics and can optionally also increase the stiffness of the retaining rail 3. A cover 7, preferably of a water box, is connected and fastened to the retaining rail 3 via a latching rail 9. The latching rail 9 is fixed via a centering cam 10 to the guide rail 5 and via the cover edge 8 to the glass edge of the window pane 1. The cover edge 8 as an elastic seal in the form of a soft edge further serves as a buffer at the time of installation and compensates production tolerances. A positioning stop 18 as in FIG. 2 is not necessary. The connection of the spring leg 6 and the latching rail 9 is done via the bulge 16 as well as the latching hook 14. The connection of the spring leg 6 and the latching rail 9 contributes only slightly to the centering; instead, it forms a restoring force which prevents disengagement of the cover 7.

FIG. 2 depicts a cross-section of a sealing arrangement according to the prior art. A pane 1, preferably a composite glass pane, is bonded via an adhesive bond 2 to a retaining rail 3. The retaining rail 3 serves for the connection of a vehicle component, preferably a water box, to the window pane 1. The retaining rail 3 includes a latching channel 4, wherein the latching channel 4 is formed by a guide rail 5 and a spring leg 6. The retaining rail 3 includes a reinforcing insert 15. The reinforcing insert preferably includes metals and elastic plastics and can optionally also increase the stiffness of the retaining rail 3. A cover 7, preferably of a water box, forms a guide channel with a latching rail 9 and a positioning stop 18. The guide rail 5 implemented as part of the retaining rail 3 is arranged in the guide channel and seals the guide channel with a spring element 11. The spring element 11 is depicted in FIG. 2 in a tensioned and a relaxed position at the same time. The latching rail 9 is, at the same time, engaged in the latching channel 4 against a spring leg 6 and provides for a fixing of the cover 7. In the guide channel 8, the spring element 11, preferably in the form of a polymeric, rubber-containing, and elastic lip, is tensioned between a contact surface 12 on the bottom of the cover 7, a positioning stop 18, and the guide rail 5. The spring element 11 is preferably implemented, in cross-section, as a single, finger-shaped lip without further recesses or protrusions. As described above, the spring element 11 seals the contact surface 12 on the bottom of the cover 7 between the positioning stop 18 and the latching rail 9. At the same time, the spring element 11 supports the cover 7 on the retaining rail 3.

In the prior art according to FIG. 2, the fixing and centering of the sealing arrangement is accomplished in the lateral direction 20 relative to pane by means of a guide channel, which is formed from the latching rail 9 and the positioning stop 18 and in which the guide rail 5 and the spring element 11 are tensioned. A substantial advantage of the invention is that the positioning stop 18 and, thus, the guide channel is no longer necessary, which represents a major simplification in terms of production technology. The fixing and centering of the latching rail 9 is accomplished in the lateral direction 20 completely by means of the centering cam 10 against the guide rail 5 and in synergistic interaction with the cover edge 8 against the glass edge 13 of the window pane 1. This measure simultaneously achieves adequate sealing and an adequate gap closure between the glass edge 13 and the cover edge 8.

Figure 3:
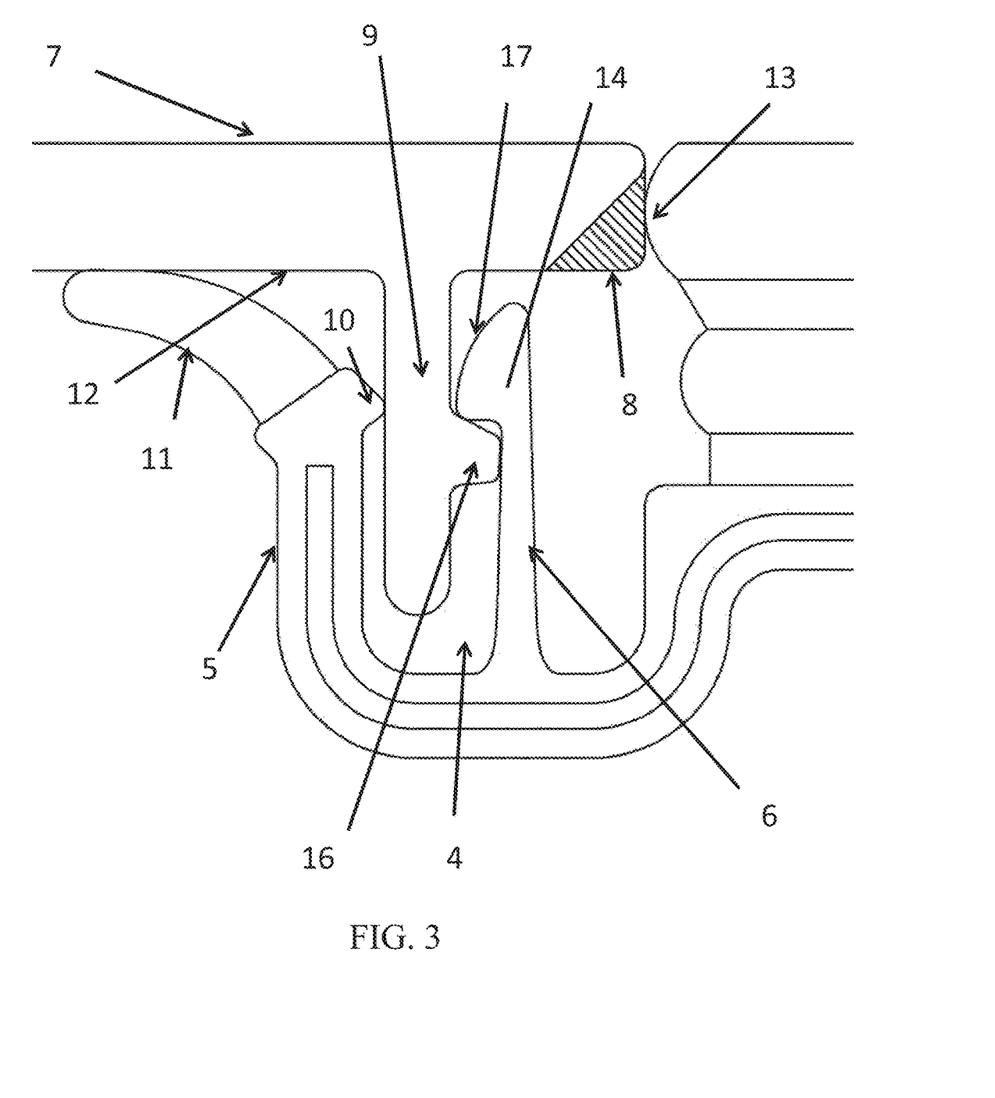
FIG. 3 an enlarged detail of the sealing arrangement according to the invention, FIG. 4 a flowchart of the method for producing the sealing arrangement according to the invention, and FIG. 5 an enlarged cross-section of the latching hook of FIG. 1 during the engagement procedure.

FIG. 3 depicts an enlarged detail of the sealing arrangement according to the invention. The structure corresponds to the basic structure described in FIG. 1. The fixing of the latching rail 9 is done via a centering cam 10 on the guide rail 5 and via the cover edge 8 on the glass edge of the window pane 1. The connection of the spring leg 6 and latching rail 9 is done via the bulge 16 of the latching rail 9 as well as the latching hook 14 of the spring leg 6. The cover edge 8 in the form of an elastic seal can compensate production tolerances at the time of installation of the water box seal. Furthermore, the risk of noise generation during relative movements between the pane and the cover can thus be reduced or avoided.

This was unexpected and surprising for the person skilled in the art.

Figure 4:
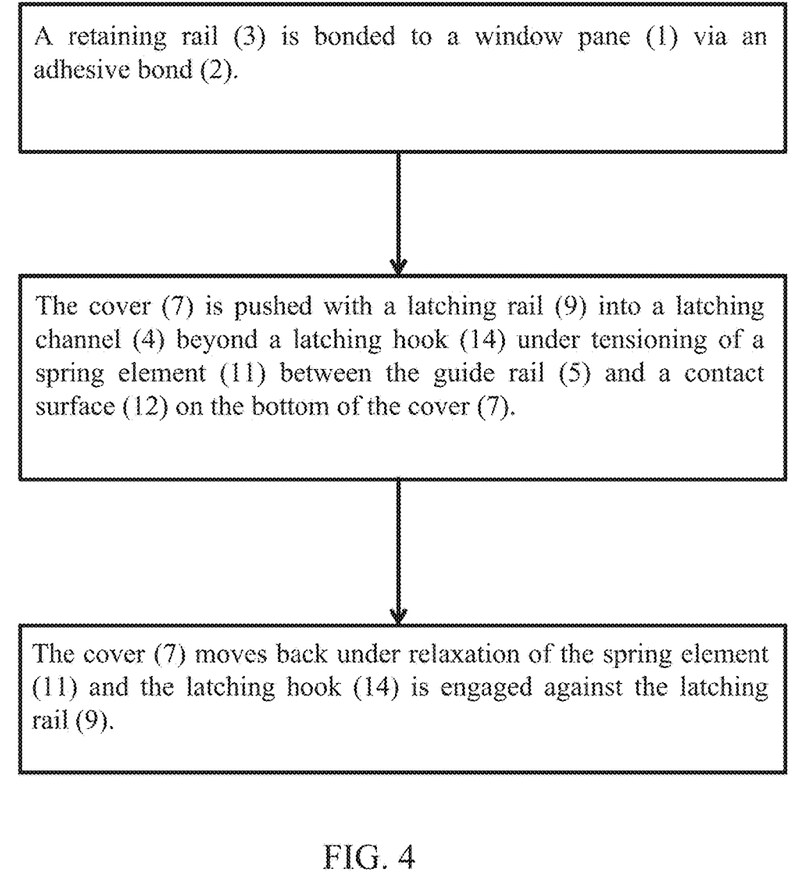

FIG. 4 depicts a flowchart of the method according to the invention for producing the sealing arrangement. In a first step, a retaining rail 3 is bonded to a window pane 1 via an adhesive bond 2 in the form of a double-sided adhesive tape. Then, the cover 7 with a latching rail 9 is pushed into a latching channel 4 beyond a latching hook 14 under tensioning of a spring element 11 between the guide rail 5 and a contact surface 12 on the bottom of the cover 7. In the final step, the cover 7 moves back under relaxation of the spring element 11 and wherein the latching hook 14 is engaged on the recesses or bulges 16 of the latching rail 9 and the glass edge 13 makes contact with the cover edge 8.

In an advantageous embodiment of the sealing arrangement according to the invention, the convexly curved engagement guide surface 17 is arranged in the distal region of the latching hook 14 facing the bulge 16. Here, "distal" means the region of the latching hook 14 that first encounters the bulge 16 during engagement and is arranged away from the connection point between the spring leg 6 and the retaining rail 3.

Latching hooks according to the prior art customarily have, in their distal region, an engagement guide surface in the form of an inclined plane with a constant angle. The matching locking element, in particular a bulge, has an engagement sliding edge with a rounding with a small radius in order to avoid force peaks or pressure peaks when the engagement sliding edge is inserted along the guide plane. The force that is necessary for insertion and locking of the latching hook with the locking element is a function of the wedge angle φ (Phi) between the direction of insertion and the inclined plane of the engagement guide surface, with the force becoming greater with the increasing wedge angle φ. An engagement guide surface in the form of an inclined plane with a constant angle thus has the disadvantage that with increasing deflection of the spring leg, the wedge angle φ between the direction of insertion and the inclined plane increases and thus the engagement force necessary for engagement increases greatly.

In contrast, the engagement guide surface 17 of the latching hook 14 according to the invention has, in cross-section, a convexly curved contour. The convexly curved contour according to the invention has the effect that an enlargement of the wedge angle φ is reduced or avoided, as it would develop during insertion with engagement guide surfaces in the form of an inclined plane according to the prior art. In other words, with convexly curved engagement guide surfaces 17 according to the invention, the wedge angle φ remains, for example, substantially constant and independent of the deflection of the spring leg 6. This has the particular advantage that the cover 7 can be locked to the retaining rail 3 precisely and without relatively great exertion of force. Alternatively, the wedge angle φ and along with it the engagement force $F_E$ can be selectively influenced by a specific convex curving of the engagement guide surface 17, which can be calculated by simple considerations or experiments. Thus, the curvature of the engagement guide surface 17 can, for example, be implemented such that at the beginning of the engagement process, a greater engagement force $F_E$ is necessary than toward the end of the engagement process. Alternatively, the curvature of the engagement guide surface 17 can, for example, be implemented such that at the beginning of the engagement process a smaller engagement force $F_E$ is necessary than toward the end of the engagement process, in order to tactilely or audibly perceive a clearer engagement effect.

In an advantageous embodiment of the engagement guide surface 17 according to the invention, the convex curvature has a local radius of curvature $r_{EF}$ of 1.5*b to 5.0*b and preferably from 2.0*b to 4.0*b, where b is the maximum deflection of the latching hook 14 during the engagement process. Here, "local radius of curvature" means that the convex curvature can have different radii of curvature at different points along the contour, each of which is within the range indicated above. As investigations of the inventor demonstrated, local radii of curvature in this range enable simple and operationally reliable engagement under mobilization of lower engagement forces $F_E$.

In an advantageous embodiment of the engagement guide surface 17 according to the invention, the convex curvature has a constant radius of curvature $r_{EF}$ from 1.5*b to 5.0*b and preferably from 2.0*b to 4.0*b, where b is the maximum deflection of the latching hook 14. As investigations of the inventor demonstrated, radii of curvature in this range enable simple and operationally reliable engagement under mobilization of lower engagement forces $F_E$. As a result of the constant radius of curvature, such guide surfaces 17 are simple to design and produce.

In an advantageous embodiment of the sealing arrangement according to the invention, the engagement sliding edge 19 has a radius of curvature $r_{EG}$ from 0.05*b to 0.5*b and preferably from 0.2*b to 0.4*b, where b is the maximum deflection of the latching hook 14. As investigations of the inventor demonstrated, such radii of curvature of the engagement sliding edge 19 are particularly well-suited to prevent pressure peaks on the engagement sliding edge 19 and the engagement guide surface 17 and to protect their materials.

Figure 5:
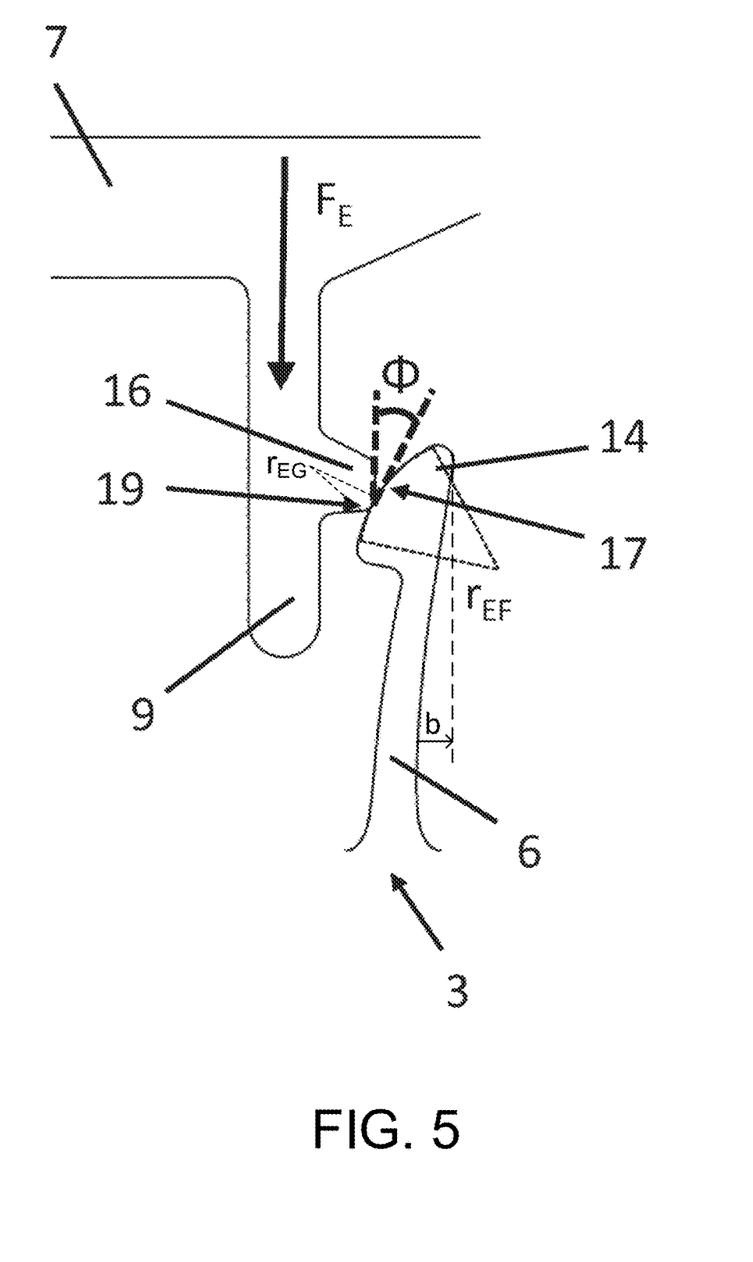

FIG. 5 depicts the basic contour of a spring leg 6 with latching hook 14 and the latching rail 9 with bulge 16 of FIG. 1 during the engagement process in an enlarged cross-sectional view.

The latching hook 14 has, on the side facing the latching rail 9, in the distal region, an engagement guide surface 17. The engagement guide surface 17 is convexly curved. The engagement guide surface 17 has here, for example, the form of a circular segment with a radius of curvature of the engagement guide surface $r_{EF}$ of 2 mm. The bulge 16 has, on the side facing the spring leg 6, in its distal region, an engagement sliding edge 19. Here, "distal" means the region of the latching hook 14, which encounters the bulge 16 first during engagement and is arranged away from the connection point between the spring leg and the retaining rail. The engagement sliding edge 19 has here, for example, the form of a circular segment with a radius of curvature of the engagement $r_{EG}$ of 0.15 mm. The maximum deflection b of the latching hook 14 in this example is 0.7 mm, which essentially corresponds here to the width of the bulge 16.

During the engagement process, an engagement force $F_E$ is exerted on the cover 7. The engagement sliding edge 19 encounters the tangent of the engagement guide surface 17 of the latching hook 14 at a wedge angle φ (Phi). The engagement force $F_E$ meets the latching hook 14 at the contact point between the engagement sliding edge 19 and the engagement guide surface 17 and is converted into a transverse force such that the latching hook 14 is moved away from the latching rail 9 by the transverse force under tensioning of the spring leg 6. The engagement force $F_E$ required depends on the restoring force of the spring leg 6, the friction between the engagement guide surface 17 and the engagement sliding edge 19, and, in particular, the wedge angle φ between the direction of the engagement force $F_E$ and the tangent to the engagement guide surface 17. This has the particular advantage that the cover 7 can be locked to the retaining rail 3 precisely and without a great expenditure of force.

This was unexpected and surprising for the person skilled in the art.

LIST OF REFERENCE CHARACTERS 1 pane
2 adhesive bond
3 retaining rail
4 latching channel
5 guide rail
6 spring leg
7 cover
8 cover edge/elastic seal
9 latching rail
10 centering cam
11 spring element
12 contact surface
13 glass edge of the pane
14 latch hook
15 reinforcing insert
16 recesses or bulges
17 rounded surface of the latching hook 14, engagement guide surface
18 positioning stop
19 engagement sliding edge
20 lateral direction

What is claimed is:

1. A sealing arrangement for a vehicle window pane, comprising:
   a retaining rail configured with a guide rail and a spring leg,
      wherein the guide rail and the spring leg form a latching channel, and
      wherein the retaining rail is fastened to a window pane; and
   a cover configured with a cover edge and a latching rail,
      wherein the cover edge is fixed on an edge of the cover facing the window pane,
      wherein the guide rail, together with the spring leg, surrounds the latching rail in the latching channel,
      wherein the spring leg and the latching rail are oriented so as to latch parallel to each other,
      wherein the cover includes the cover edge and the cover edge makes contact with a glass edge of the window pane,
      wherein the guide rail is configured with a spring element, the spring element being arranged and tensioned against a contact surface on the bottom of the cover, and
      wherein the guide rail rests against the latching rail via a centering cam and, together with the cover edge, fixes and centers the cover in the latching channel.

2. The sealing arrangement according to claim 1, wherein the spring element is formed, in cross-section, as a single lip.

3. The sealing arrangement according to claim 1, wherein the spring element has a Shore hardness of Shore A 40 to Shore A 90.

4. The sealing arrangement according to claim 3, wherein the spring element has a Shore hardness of Shore A 50 to Shore A 75.

5. The sealing arrangement according to claim 1, wherein the cover edge has an elastic seal in the form of an edge.

6. The sealing arrangement according to claim 5, wherein the elastic seal has a Shore hardness of Shore A 40 to Shore A 75.

7. The sealing arrangement according to claim 6, wherein the elastic seal has a Shore hardness of Shore A 50 to Shore A 65.

8. The sealing arrangement according to claim 1, wherein the retaining rail includes a reinforcing insert.

9. The sealing arrangement according to claim 1, wherein the guide rail includes a reinforcing insert.

10. The sealing arrangement according to claim 1, wherein the retaining rail is bonded to the window pane via an adhesive bond.

11. The sealing arrangement according to claim 10, wherein the adhesive bond comprises a double-sided adhesive tape.

12. The sealing arrangement according to claim 1, wherein the spring leg has a latching hook.

13. The sealing arrangement according to claim 1, wherein the cover edge and the cover are a single piece, formed from the same material.

14. The sealing arrangement according to claim 5, wherein the cover forms a taper on a bottom of the cover and the elastic seal at least partially fills the taper.

15. A method of using a sealing arrangement for a vehicle window pane, comprising:
   providing a sealing arrangement comprising a retaining rail configured with a guide rail and a spring leg that form a latching channel; and
   affixing the retaining rail on a windshield or a rear window pane of a vehicle,
      wherein the sealing arrangement further comprises a cover configured with a cover edge and a latching rail;
      wherein the cover edge is fixed on an edge of the cover facing the window pane,
      wherein the guide rail, together with the spring leg, surrounds the latching rail in the latching channel,
      wherein the spring leg and the latching rail are oriented so as to latch parallel to each other,
      wherein the cover includes the cover edge and the cover edge makes contact with a glass edge of the window pane,
      wherein the guide rail is configured with a spring element, the spring element being arranged and tensioned against a contact surface on the bottom of the cover, and
      wherein the guide rail rests against the latching rail via a centering cam and, together with the cover edge, fixes and centers the cover in the latching channel.

16. A method of using a sealing arrangement for a vehicle window pane, comprising:
   providing a sealing arrangement comprising a retaining rail configured with a guide rail and a spring leg that form a latching channel; and
   affixing the retaining rail on a vehicle pane used as a windshield, wherein the cover is configured as a water box
      wherein the sealing arrangement further comprises a cover configured with a cover edge and a latching rail;
      wherein the cover edge is fixed on an edge of the cover facing the window pane,
      wherein the guide rail, together with the spring leg, surrounds the latching rail in the latching channel,
      wherein the spring leg and the latching rail are oriented so as to latch parallel to each other,
      wherein the cover includes the cover edge and the cover edge makes contact with a glass edge of the window pane,
      wherein the guide rail is configured with a spring element, the spring element being arranged and tensioned against a contact surface on the bottom of the cover, and
      wherein the guide rail rests against the latching rail via a centering cam and, together with the cover edge, fixes and centers the cover in the latching channel.

* * * * *